Sept. 24, 1957     W. C. WOOTTON     2,807,068
MOLDING AND LIKE FASTENING DEVICE
Filed July 20, 1954
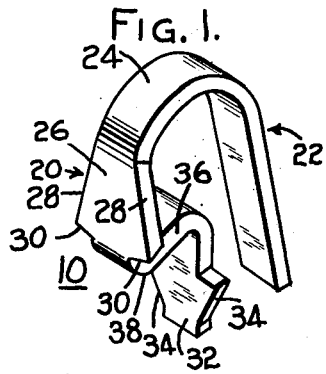
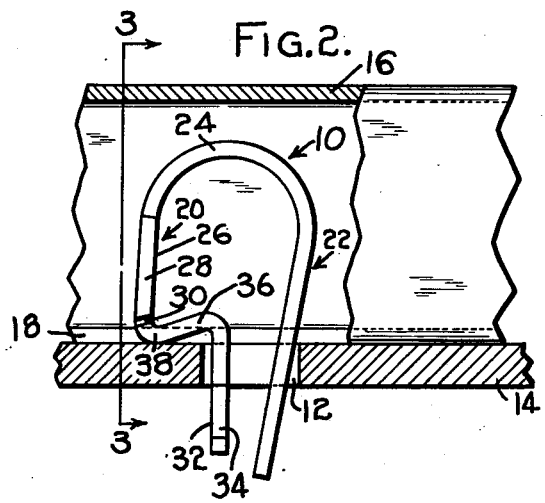
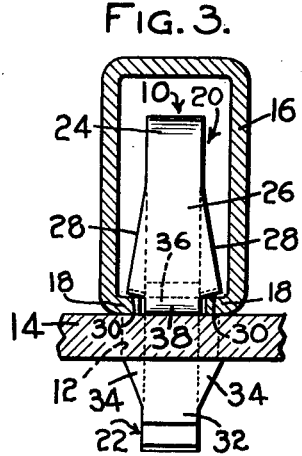
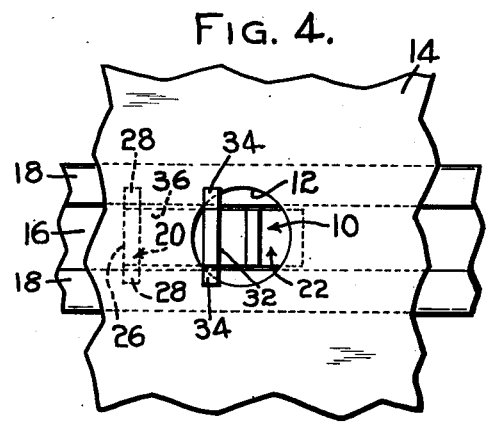
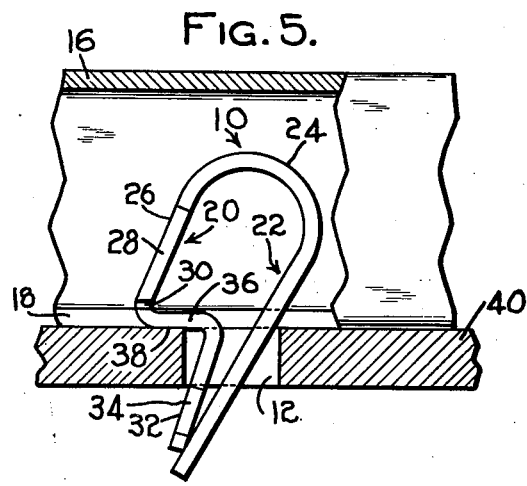
INVENTOR:
WILLIAM C. WOOTTON,
BY Robert E. Ross
ATTORNEY.

United States Patent Office 2,807,068
Patented Sept. 24, 1957

2,807,068

MOLDING AND LIKE FASTENING DEVICE

William C. Wootton, Centerville, Calif., assignor, by mesne assignments, to United-Carr Fastener Corporation, Boston, Mass., a corporation of Delaware Application July 20, 1954, Serial No. 444,496

2 Claims. (Cl. 24—213)

This invention relates generally to fastening devices, and has particular reference to a device for securing a channelled molding to an apertured support.

The object of the invention is to provide a one-piece fastening device for attaching a molding to a panel.

A further object of the invention is to provide a fastening device for attaching a molding to a panel which is adapted to automatically adjust itself to the thickness of the panel.

Other objects of the invention will, in part, be obvious, and will, in part, appear hereinafter.

In the drawing:

Fig. 1 is a perspective view of a fastening device embodying the features of the invention;

Fig. 2 is a view in elevation, partly in section, of a molding fastener assembly embodying the features of the invention;

Fig. 3 is a view in section on line 3—3 of Fig. 2;

Fig. 4 is a bottom plan view of the assembly of Fig. 2; and

Fig. 5 is a view in elevation, partly in section of the fastener assembled into a thicker panel.

Referring to the drawing, there is illustrated a molding fastener 10, which is adapted to be assembled into an opening 12 in a panel 14 to receive and engage a strip of channelled molding 16 of the type having inturned edges 18.

The fastener 10 is formed of a strip of resilient material and is generally U-shaped providing a pair of spaced legs 20 and 22 connected by a bend 24 having a radius of predetermined size to appear hereinafter.

The leg 20 comprises an upper portion 26 having diverging side edges 28 leading to shoulders 30 to receive the molding in snapping engagement, a lower portion 32 offset from the upper portion toward the other leg and having projecting shoulders 34 on the side edges for engaging the lower side of the panel. In the preferred embodiment the upper end of the lower portion is spaced upwardly further than the lower end of the upper portion, so that the connecting medial portion 36 is inclined downwardly with the lowermost point being spaced laterally from the lower portion 32 to provide a panel bearing portion 38. The leg 22 is normally inclined outwardly from the leg 20 for a purpose to appear hereinafter.

To assemble the fastener into the panel opening 12 the legs 20 and 22 are squeezed together and inserted into the opening and then allowed to flex outwardly, so that the legs bear against opposing portions of the opening, with the projecting shoulders 34 engaging the under side of the panel. The radius of the bend 24 is sufficiently large that the leg 22 is thus retained in the opening inclined toward the other arm and thereby bears against the upper edge of the panel in the opening (see Fig. 2). The arm 22 is freely movable longitudinally in the opening, hence the tendency of the arm 22 to spring outwardly causes it to tilt the arm 20 in a direction to tghten its engagement with the panel, that is by tending to tilt the upper end of the arm to the left as seen in Fig. 2, to force the panel bearing portion 38 downwardly against the panel and draw the shoulders 34 on the lower portion upwardly against the bottom surface of the panel.

The molding may thereafter be assembled by pushing it down onto the fastener so that the inturned edges ride outwardly and snap behind the shoulders 30. To accomodate minor variations in thickness of the molding edges the shoulders may be inclined slightly downwardly.

Referring to Fig. 5, the fastener 10 is illustrated assembled with a panel 40 having a thickness substantially greater than that of the panel 14. The fastener accommodates the thicker panel by tilting so as to increase the effective vertical distance between the panel bearing portion 38 and the shoulders 34, and the leg 22, by bearing against the upper edge of the panel in the opening, maintains the leg 22 in tight engagement with the panel.

Since certain other obvious modifications may be made without departing from the scope of the invention, it is intendded that all matter contained herein be interpreted in an illustrative and not in a limiting sense.

I claim:

1. A molding fastener for assembly into a panel opening, to receive a channelled molding in snapping engagement and retain it against the panel, said fastener comprising a U-shaped member having a pair of arms for entering the opening, one of said arms having an upper molding engaging portion, a lower portion offset therefrom toward the other arm for entering the panel opening and having projecting shoulder means for engaging the lower side of the panel, said portions being connected by a medial portion having means spaced from the lower portion for bearing against the upper surface of the panel, said other leg being freely movable longitudinally in the panel opening.

2. A fastener device for assembly into a panel opening to retain an article in assembly therewith, comprising a pair of arms connected to one another by a reverse bent portion, one of said arms having an article engaging portion, a lower portion offset therefrom toward the other arm for entering the panel opening and having projecting shoulder means for engaging the lower surface of the panel, said portions being connected by a medial portion having means spaced from the lower portion for bearing against the upper surface of the panel, said other leg being freely movable longitudinally in the panel opening.

References Cited in the file of this patent

UNITED STATES PATENTS

| 656,196 | Lovejoy | Aug. 21, 1900 |
| 2,144,171 | Van Uum | Jan. 17, 1939 |
| 2,175,814 | Pender | Oct. 10, 1939 |
| 2,300,349 | Del Camp | Oct. 27, 1942 |
| 2,499,637 | Flora | Mar. 7, 1950 |
| 2,520,725 | Judd | Aug. 29, 1950 |
| 2,724,882 | Poupitch | Mar. 29, 1955 |

FOREIGN PATENTS

| 684,107 | Great Britain | Dec. 10, 1952 |